United States Patent
Hills et al.

[15] 3,661,745
[45] May 9, 1972

[54] SYNTHESIS OF DODECYL MERCAPTAN USING HIGH ENERGY RADIATION

[72] Inventors: Peter Robert Hills, Abingdon; Michael William Spindler, Cowley; Kenneth Wallace Carley-Macauly, Didcot, all of England

[73] Assignee: United Kingdom Atomic Energy Authority, London, England

[22] Filed: Sept. 30, 1968

[21] Appl. No.: 763,652

[30] Foreign Application Priority Data

Sept. 29, 1967 Great Britain.....................44,602/67

[52] U.S. Cl....................................................204/162 HE

[51] Int. Cl. ................................................................B01j 1/10
[58] Field of Search......................................................204/162

[56] References Cited

UNITED STATES PATENTS 3,223,738  12/1965  Crain et al. ............................204/162
3,257,302  6/1966  Warner..................................204/162

*Primary Examiner*—Benjamin R. Padgett
*Attorney*—Larson, Taylor and Hinds

[57] ABSTRACT

A process is disclosed for the synthesis of dodecyl mercaptan from a 50:50 mixture of dodecene and hydrogen sulphide at a temperature in the range 0° - 50° C. and a pressure of about 20 atmospheres, using cobalt-60 radiation to effect the reaction. A full flow sheet is described.

2 Claims, 1 Drawing Figure

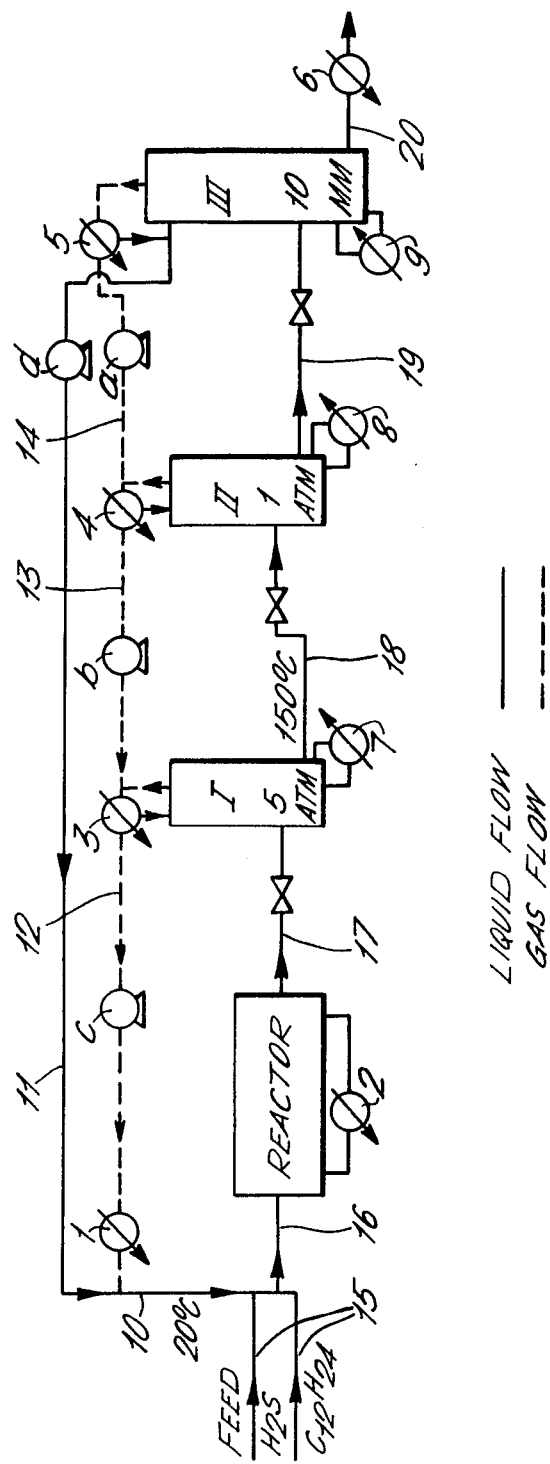

SYNTHESIS OF DODECYL MERCAPTAN USING HIGH ENERGY RADIATION

BACKGROUND OF THE INVENTION

This invention relates to the synthesis of docecyl mercaptan by the use of radiation.

In the radiation synthesis of dodecyl mercaptan the main reaction is:

$$C_{12}H_{24} + H_2S \rightarrow C_{12}H_{25}SH$$

and a side reaction is:

$$2C_{12}H_{24} + H_2S \rightarrow (C_{12}H_{25})_2S$$

SUMMARY OF THE INVENTION

The invention provides a process for the radiation synthesis of dodecyl mercaptan, wherein a 50:50 mixture of dodecene and hydrogen sulphide is caused to react at a temperature within the range 0°–50° C. and at a pressure of about 20 atmospheres.

BRIEF DESCRIPTION OF THE DRAWING

The accompanying drawing is a flow diagram illustrating the invention.

DESCRIPTION OF THE PREFERRED EMBODIMENT

The flow diagram of the accompanying drawing is based on a 75 percent conversion of dodecene in a 50:50 mixture with hydrogen sulphide. In the drawing FIGS. 1–9 represent heat exchangers, capable of controlling the temperature of reactants and reaction products at various points in the plant, FIGS. a–d represent pumps/compressors and FIGS. I–III represent columns for the separation of unreacted material from the reaction product.

The reaction is carried out at about 20 atmospheres pressure and at a temperature in the range 0°– 50° C. Under these conditions the side reaction above described accounts for 3–4 percent of the dodecene conversion.

Heat exchanger heating and cooling loads, and pump/compressor requirements are as follows:

The flow sheet assumes
i. Feed of hydrogen sulphide and dodecene are available as liquids at below 20° C. Pumps/compressors for these are not shown.
ii. Reactor working pressure 20 atmospheres. Reaction temperature 20° C. Provision must be made to keep this temperature below 50° C. if boiling is not to occur.
iii. That the reactor geometry is a cylinder containing a centrally located tube in which a cobalt-60 radiation source is located.

Safety and control devices are not shown but it may be necessary to provide a dump tank for the reactor.

The flow sheet shows the compressor (a) from Column III recycling hydrogen sulphide into the main circuit. Since this column operates under vacuum some air inleakage may occur, this may lead to a requirement to discharge the hydrogen sulphide from (a) rather than recycling it, and/or to provide a vent with a blow-off valve and cold trap to atmosphere, for non-condensibles arriving at the condenser which also provides a control of the high pressure end of the plant.

Conversion proceeds to a virtually asymptotic value, whose level increases with decreasing proportion of olefine in the reaction mixture. Reaction rates in general decrease markedly above the 50–60 percent conversion level. However using a larger reactor giving more efficient use of cobalt, it may be desirable to react to 70–80 percent conversion (so reducing recycle).

In spite of the decrease in percentage conversion (per unit time) as the dodecene proportion increases, the mass yield for a given volume of reaction mixture increases. Thus it is best to operate at the stoichiometric ratio (50 m percent) in the feed, as shown in the flow sheet.

When considering possible variants in the process parameters it is important to consider the nature of the liquid flows in the reactor, and also the dimensions of the reactor required to deal with these flows. Thus assuming that the liquids in the reactor are in plug flow at 20° C., and receive $5 \times 10^3$ R/hr. in an outer zone, $5 \times 10^4$ R/hr. in an inner zone of the reactor then according to the following table:

| Example | Time for reaction (mins.) | Reaction mixture feed rate (l/hr.) | Reactor volume (litres) | Recycle flow sheet |
|---|---|---|---|---|
| 1. 50 m. percent $C_{12}H_{24}$ to 75% conv'n | 120+130=250 | 77 | 320 | As shown in accompanying drawing. |
| 2. 50 m. percent $C_{12}H_{24}$ to 50% conv'n | 40+30=70 | 115 | 135 | Flow sheet similar to above, but with recycles increased 4-fold. |
| 3. 20 m. percent $C_{12}H_{24}$ to 80% conv'n | 80+70=150 | 100 | 250 | Large proportion of $H_2S$ requires extra column before I, to flash and condense some 1,600 moles/hr. (55 kg./hr. $H_2S$ at 20 atms. Subsequent layout and flows as example (1). |

| Heat Exchanger 92 K Cal/hr. | | | |
|---|---|---|---|
| Cooling | | Heating | |
| 1 | 80 | 7 | 3500 |
| 2 | 2500 | 8 | 100 |
| 3 | 200+ | 9 | 2500 |
| 4 | 150+ | | |
| 5 | 3000 | | |
| 6 | 2700 | | |

| Pumps/Compressors | |
|---|---|
| Duty | Watts |
| a/ 10mm–760mm (1.5 l/min) | 500 |
| b/ 1 atm–5atm | 200 |
| c/ 5 atm–20 atm | 200 |
| d/ liquid 16 l/hr. | 100 |

The separation columns I–III comprise flash columns I and II at 5 and 1 atmospheres respectively and a vacuum distillation column III at ca. 10 mm. mercury. All the columns operate at 150° C. reboiler temperature and a condensate temperature of 40° C.

Flow rates of reactants and products at points 10–20 in the drawing, expressed as Kgms per hour are as follows:

If plug flow cannot be achieved and a mixed reactor is used, reaction takes place at virtually the discharge composition. This would decrease conversion to 60–65 percent and require a recycle increase over that shown in the flow diagram. In addition, allowance should be made for increased recycle to compensate for decrease of conversion and/or required increase in output from the reactors. Reaction rates being increased at temperatures above 20° C., which are likely in the reactor.

At an overall G value of $2 \times 10^4$, the calculated cobalt requirement is $2250/\eta$ curies where $\eta$ is the absorption efficiency in the liquid reactants. This G value corresponds to 75 percent conversion of a 50m percent mixture, at a level of $5 \times 10^4$ R/hr. If $\eta \sim 0.5$, source required $\sim 5,000$ curies.

Now a 60 cm. long source of 5,000 curies will give the dose rate of $5 \times 10^4$ R/hr. in a 10 cm. annulus at a mean radius of 20 cm. from the source center, i.e. the radiation level checks for the reactor geometry, which is a cylinder with a central tube to hold the source. The required reactor volume is then some 300 liters if plug flow can be achieved. For a reactor 1 ft. I.D. $\times$ 2.5 ft O.D. the volume 117 liters/ft. length. Hence a reactor

| | 10 | 11 | 12 | 13 | 14 | 15 | 16 | 17 | 18 | 19 | 20 |
|---|---|---|---|---|---|---|---|---|---|---|---|
| $H_2S$ | 2.36 | 0.002 | 2.36 | 5.93 | 0.10 | 7.21 | 9.59 | 2.36 | 0.59 | 0.102 | |
| $C_{12}H_{24}$ | 11.69 | 11.56 | 0.017 | 0.050 | 0.025 | 36.5 | 48.2 | 11.80 | 11.83 | 11.8 | 0.13 |
| $C_{12}H_{25}.SH$ | .20 | .202 | | 0.004 | 0.004 | | .20 | 42.2 | 42.2 | 42.2 | 42.0 |
| $(C_{12}H_{25})_2S$ | | | | | | | | 1.56 | 1.56 | 1.56 | 1.56 | about 3 ft. long × 2.5 ft. O.D. is adequate.

However this assumes plug flow of reactants which will be difficult at these low flows. Stagnant regions and bypassing of reactants are possible. An alternative is a fully mixed reactor giving a decreased conversion requiring increased recycle. The reactor O.D. is then increased to 3 ft., and a conversion level of around 60–65 percent of dodecene allowed for by increased recycle. Thus reactor volume is not increased excessively because the outer levels of radiation assumed for the plug flow case (example 3) are below those likely for the actual source and geometry. A further alternative form of reactor is a "stirred" reactor, discharging via a coil wound round the central tube, to give a high final irradiated level and improved conversion.

We claim:

1. A process for the radiation synthesis of dodecyl mercaptan comprising passing an equimolar mixture of dodecene and hydrogen sulphide through a reactor vessel, simultaneously irradiating the mixture in the reactor vessel with high energy ionizing radiation, the reaction temperature being maintained in the range 0-50 °C and the reaction pressure being about 20 atmospheres.

2. A process according to claim 1, wherein the reaction temperature is maintained at 20° C.

* * * * *